Nov. 8, 1949   R. C. KEPNER   2,487,447
DUMP CAR CONTROL
Filed Aug. 4, 1943   2 Sheets-Sheet 1
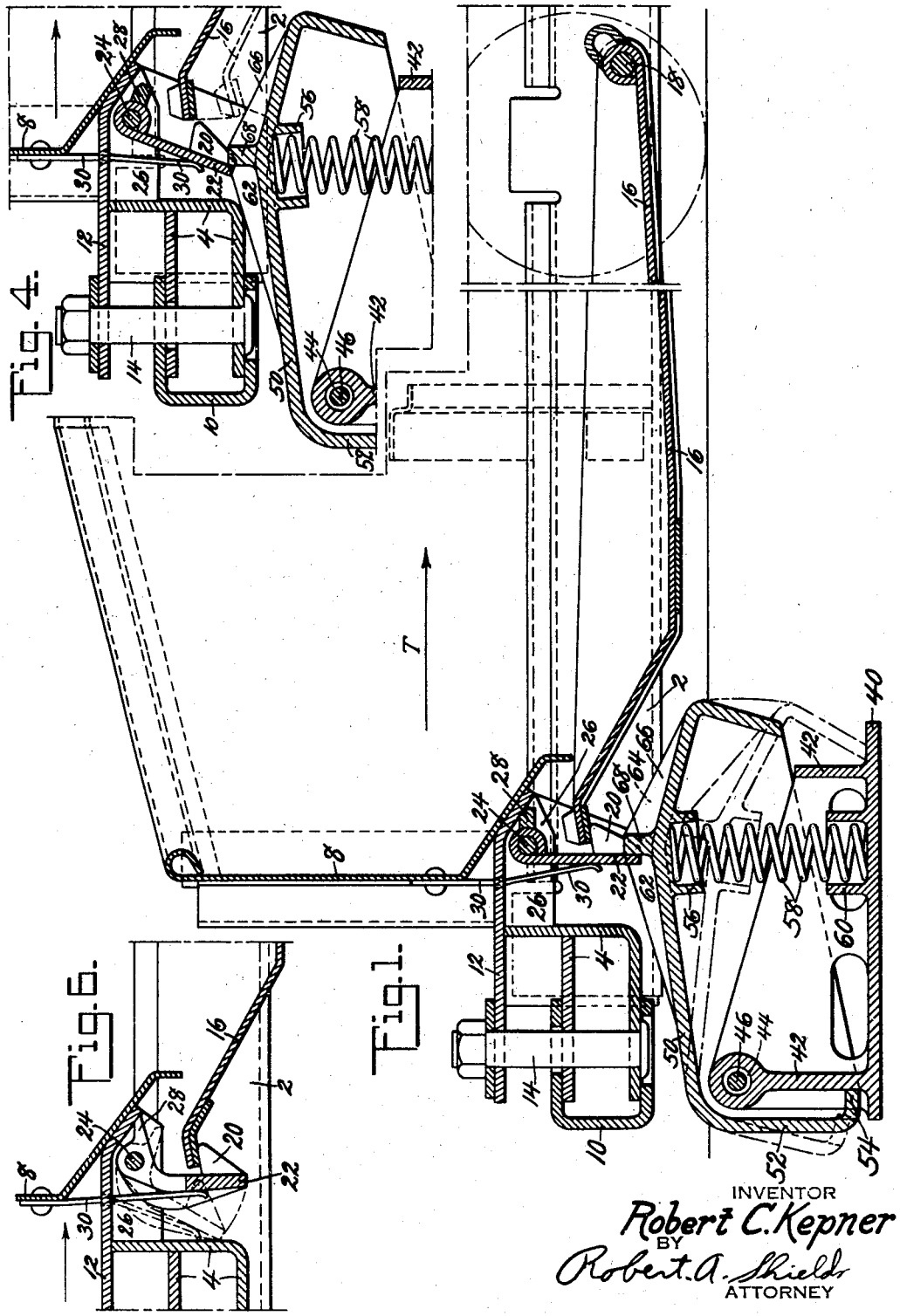
INVENTOR
Robert C. Kepner
BY
Robert A. Shields
ATTORNEY Nov. 8, 1949     R. C. KEPNER     2,487,447
DUMP CAR CONTROL
Filed Aug. 4, 1943     2 Sheets-Sheet 2
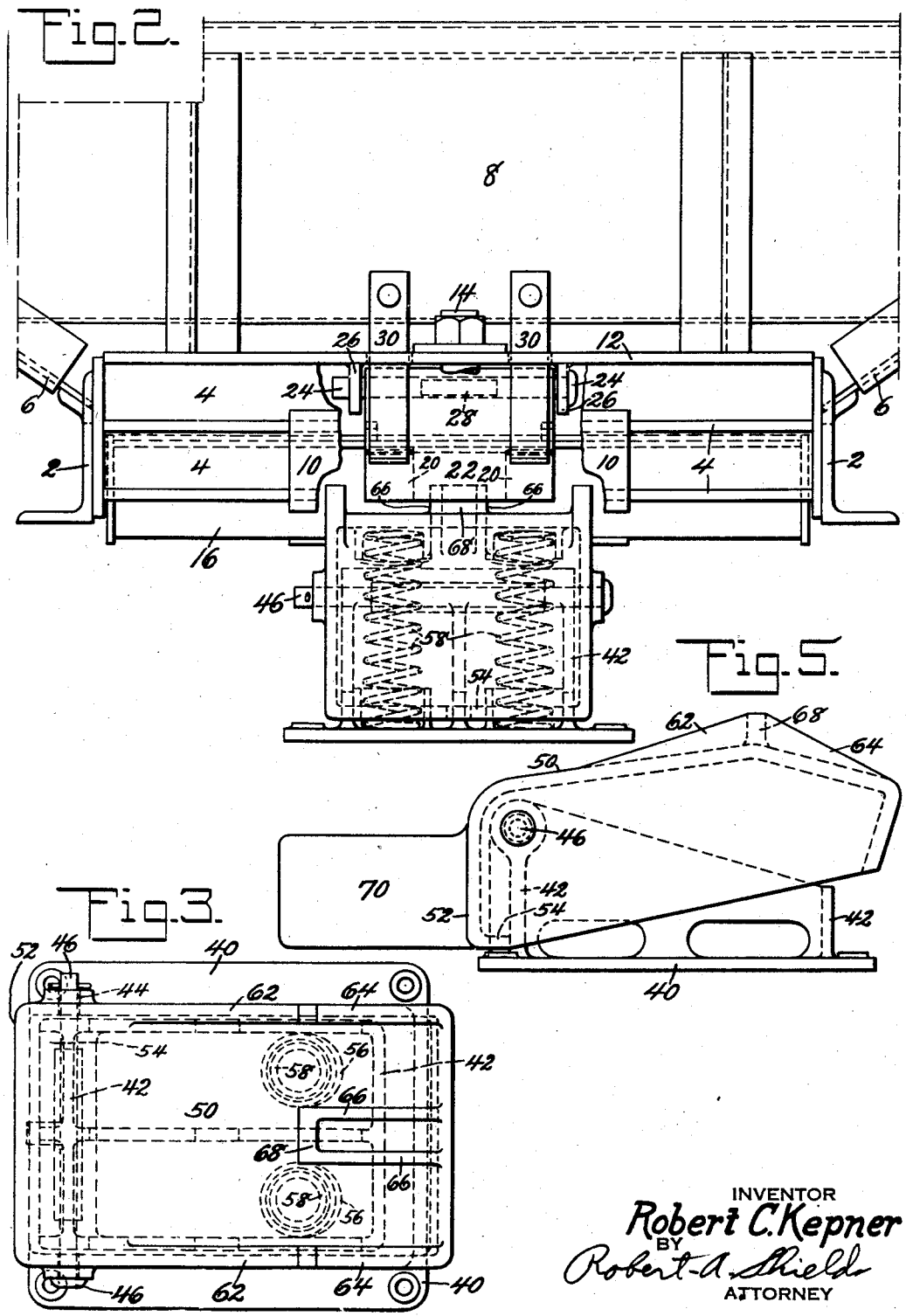
INVENTOR
Robert C. Kepner
BY
Robert A. Shields
ATTORNEY Patented Nov. 8, 1949

2,487,447

UNITED STATES PATENT OFFICE 2,487,447

DUMP CAR CONTROL

Robert C. Kepner, Bloomsburg, Pa., assignor to American Car & Foundry Company, New York, N. Y., a corporation of New Jersey Application August 4, 1943, Serial No. 497,286

19 Claims. (Cl. 214—58)

1

This invention relates to dump cars in general and in particular to dump cars of the automatic drop bottom type.

Drop bottom dump cars have for many years been constructed with the latching means for the doors projecting beyond the body contour in order that they might strike trackside ramps to release the doors for opening. Due to the projection of the latch means beyond the body contour obstructions such as stone, coal, etc., might contact the latch release and dump the doors when the car was in the mine, with the result that the entire operation would be tied up until the car was unloaded and the doors closed. In addition to possible release of the doors, the latch control means would frequently be bent so as to be rendered wholly inoperative and the car would have to be shopped until the release mechanism was placed back in an operative condition. It is an object, therefore, of the present invention to provide a door latching device located wholly within the lines defining the body contour.

A further object of the invention is the provision of a drop bottom car having the door latching device so located as to be protected by massive members of the car structure, to the end that obstructions will be pushed aside before they could possibly contact the latching device.

A still further object of the invention is the provision of a drop bottom car having a protected latching device adapted to cooperate with a special trip device capable of releasing the protected door latch.

Yet another object of the invention is the provision of a movably mounted tripping device which can partially move within the car contour to engage and release the door latch of a dump car passing over the trip device.

These and other objects of the invention will be apparent to persons skilled in the art from a study of the following description and accompanying drawings, in which Fig. 1 is a longitudinal section of one end of the car and the cooperating tripping device;

Fig. 2 is an end view of the car and trip device with parts broken away to better disclose the construction;

Fig. 3 is a plan view of the special trip device;

Fig. 4 is a sectional view similar to Fig. 1 but showing the relation of parts upon release of the door latch;

Fig. 5 is an elevational view of a modified form of trip device, and

Fig. 6 is a sectional view similar to Figs. 1 and

2

4 but showing a slight modification of the door latch.

Referring now to the drawings in detail it will be seen that the latch has been applied to a more or less conventional type of drop bottom car constructed with side sills 2 joined together at their ends by end sill structures 4. The side sills support sloping wing bottoms 6 and are tied together by end walls 8 which are in turn connected to the end sill structures. The end sill structures, as particularly shown in Figs. 1 and 4, are built up of a plurality of plates welded or otherwise secured together to provide space plates for the reception of bumper blocks or springs, not shown, and adapted to bear against bumping caps 10. These space plates, as well as the bumper cap and a top cover plate 12, are pierced to receive a coupling pin or bolt 14 allowing the car to be connected entrain. The space between the side sills 2 is adapted to be closed by a plurality of drop bottom doors 16, only one of which is shown. These doors are mounted upon transversely extending hinge rods 18 for swinging movement longitudinally of the car. Certain of the doors (not shown) have their free edges engaged with and supported by the hinge edge of the next rearward door. However, since the invention is not concerned with these doors, only the rearmost door has been shown. This rearmost door has its free or rear end supported upon ledges 20 forming part of a latch structure 22 pivotally mounted on a rod 24 extending through plates 26 welded or otherwise secured to the end structure top plate 12. In order to limit forward swinging motion of the latch structure a projection 28 is welded or otherwise secured to the latch structure and adapted to engage the downwardly and inwardly inclined end of the top cover plate as clearly shown in Fig. 1. In order to constantly urge the latch into door engagement position short leaf springs 30 are attached to the end sheets 8 and extend downwardly through slots in the top cover plate and have their free ends bearing against the latch structure 22. It should be particularly noted that the bottom part of the latch structure 22 is above the lower edge of the side sills and above the lower edge of the bumping structure, as well as above the lower edge of the door when in fully closed position. Since no part of the latch projects toward the side of the car, it can not in any way be operated by trackside obstruction or equipment and since no part of the latch structures projects below the body contour no obstruction between the tracks can strike the latch structure. This is true for either direction of travel of the car, for if the car is traveling forward the doors will scrape any obstruction out of the way, while if the car is backing the end structure will clear any obstructions between the rails and in this manner fully protect the latch device.

The latch structure as shown in Figs. 1 and 4 has been made up of a plurality of members welded or otherwise secured together. In some instances, however, it may be desirable to make the latches of drop forgings or castings and such a latch structure has been shown in Fig. 6. In this case the ledges 20 and stops 28 are integrally formed with the latch structure as clearly shown.

In order to release the protected door latch device a special trip device is necessary. As clearly shown in the figures, this device consists of a base plate 40 adapted to be attached to the ties or other structure between the running rails. This base plate is formed with upstanding ribs 42, certain of which are formed to provide an opening 44 for the reception of a pin or rod 46. This pin or rod provides a pivotal mount for an inverted pan-shaped structure having a top wall 50 and a rear end wall 52 formed with an inturned flange 54 which is adapted to strike against the end rib of the base plate member and thereby limit swinging of the pivotally mounted member in one direction. The top wall of the pivotally mounted member is provided with downwardly open spring pockets 56 adapted to receive springs 58 which in turn are seated in spring pockets 60 formed on the upper surface of the base plate 40. The upper surface of the top wall 50 is formed with side longitudinally extending wedge shaped ribs 62 projecting upwardly from the top surface and having their highest point located substantially in the plane of the axes of the springs 58. These ribs 62 merge with other upwardly extending side ribs 64 tapering from the high point toward the front edge of the top surface, as clearly shown in Fig. 2. Intermediate the upwardly projecting tapered side ribs are additional upwardly extending centrally located ribs 66 tapering from the forward edge of the top surface upwardly and to the rear on the same inclination as ribs 64 and terminating at substantially the same high point where they are joined by a short transversely extending rib 68. This transversely extending rib 68 forms a stop or vertical abutment adapted to strike the lower end of the latch device as clearly shown in Figs. 1 and 4. It will be obvious that the top of rib 68 can be flush with or slightly below the highest point of ribs 62, 64 and 66 without in any way modifying the operation of the trip device.

In some cases it will be found desirable to urge the top or pan-shaped portion of the trip device upwardly with a substantially constant pressure and this may be accomplished by use of hydraulic devices or by means of a counterweight 70 attached to or formed integral with the rear wall 52, all as clearly shown in Fig. 5. The remainder of the structure shown in Fig. 5 is substantially identical with that shown in Figs. 1 and 4 with the exception that the spring pockets have been eliminated and accordingly the same reference numerals have been applied as those used in connection with Figs. 1 to 4 inclusive. Such a counterweighted trip member will urge the top surface and projecting ribs upwardly with a substantially constant pressure as distinguished from the variable pressure which would be exerted by the springs 58. In addition to this advantage there would be no springs or other parts to break or be replaced through use.

The operation of the construction is as follows and assuming the car to be moving in the direction of an arrow T, Fig. 1, and with the doors closed and latched as indicated: As the forward end (not shown) of the car moves over the special tripping device the inclined ribs 62 will rub along the under surface of the car causing the pivoted portion of the trip device to rise and fall in accordance with the changing contour of the under surface of the car. As the latch end of the rear door reaches the trip device the springs 58 will urge the pivoted portion of the trip device upwardly bringing the transverse rib or ledge 68 into position to engage the lower end of the latch structure 22. This is the condition of the parts as shown in full lines in Fig. 1. Continued forward movement of the car will cause tripping ledge 68 to swing the latch structure 22 around its pivot 24 against the action of springs 30. That the ledge 68 and latch surface 22 can not accidentally separate will be evident from the fact that the face of ledge 68 and the face of latch 20 make an angle of substantially zero degrees with respect to the vertical, and the line normal to the face of ledge 68 makes an angle of substantially zero degrees with respect to the horizontal. In other words these angles are within ten degrees of each other in value and the sliding component along the faces 22 and 68 will be less than the coefficient of friction for these faces thus insuring that the latch will be released prior to depression of the release structure or trip device. As the latch structure is moved toward released position the wedge shaped ribs 62 will engage the lower surface of the end structure and cause the pivoted member of the tripping device to start moving downwardly. When the parts have reached substantially the position shown in Fig. 4, the door 16 is released for dropping and the latch structure 22 is about to leave contact with the stop or tripping ledge 68 of the pivoted member of the tripping device which is being moved downwardly by the inclined ribs 62. As the door drops it may strike the inclined ribs 64 pushing the pivoted member down instead of its being finally pushed down by the inclined wedge ribs 62. This, of course, is a matter of timing but in any case whether the pivoted trip device after releasing the door is pushed downwardly by the inclined rib 62 or by the falling door is immaterial, for in any case it will be held down as the car passes the tripping device thereby permitting the end structure to clear such tripping device without any danger of the ledge 68 striking the end structure. After release of the door, the springs 30 will snap the latch back into door engaging position with excessive rotation limited by stop 28. After dumping the contents of the car the door may be closed in the conventional manner and its free edge will strike the inclined edges of ledge 20 moving the latch structure rearwardly until the door is fully raised, after which the springs 30 will again snap the latch into door supporting position. In cases where the car with doors latched is moved back over the tripping device, neither the tripping device nor the car structure can be in any way harmed, for the inclined ribs 64 and 66 will keep the tripping device clear of snagging contact with any part of the car and contact of the ledge 68 with the latch structure will be prevented by the inclined ribs 66. In this manner any bending of the latch device during the reverse travel of the car is prevented.

While the construction has been described more or less in detail with specific reference to three forms thereof, it will be obvious to persons skilled in the art that various modifications and rearrangements of parts other than those shown and described may be made and all such modifications and rearrangements of parts are contemplated as will fall within the scope of the appended claims defining my invention.

What is claimed is:

1. In a drop bottom car adapted to run on tracks and having side structures, end structures and bottom structures defining the cross-sectional contour of the car, said end structures including a top plate, a door forming part of the bottom structure and hinged to swing to open position by gravity, and means pivotally carried by said top plate holding said door in closed position and located wholly within the lines defining the maximum cross-sectional contour of the car, said means being contactable with vertically movable means disposed between the tracks along the path of travel of the car, said vertically movable means being adapted at times to project within said lines to release the door for opening.

2. In a drop bottom car adapted to run on tracks and having side structures, end structures and bottom structures defining the cross-sectional contour of the car, said end structures including a top plate, a door forming part of the bottom structure and hinged to swing to open position by gravity, a hook pivotally carried by said top plate and adapted to releasably hold said door in closed position, said hook having its lowermost portion located above the horizontal plane through the lowermost portions of said door and end structures which are in longitudinal alignment with said hook, and said hook being so constructed and arranged as to have its lower end contact vertically movable means disposed between the tracks along the path of travel of the car, said vertically movable means being projectable above said horizontal plane to thereby release the door for opening.

3. A dump controller for cars traveling on tracks and having bottom doors hinged to swing to open position by gravity and held in closed position by means located wholly within the maximum cross-sectional contour of the car comprising, a base member secured between the tracks, a top member pivotally mounted on said base member, means yieldably urging said top member upwardly toward the car bottom to follow the contour thereof, a projection formed on said top member and adapted to contact said first named means to move the same to door releasing position during travel of the car, and wedge shaped ribs formed on said top member adjacent said projection and preventing positive engagement of said projection with any part of the car excepting said first named means.

4. A dump controller for cars traveling on tracks and having an end bumping structure and a bottom door hinged on the car to swing into open position by gravity and normally held in closed position by means located wholly above the lower surface of the end bumping structure comprising, a trip member mounted on the trackway for vertical movement between the tracks, a projection normally extending upwardly from said trip member to a point above the lower surface of the car end bumping structure and adapted to engage said means and move the same to door releasing position during travel of the car, and means connected to said trip member and adapted to move the same downwardly whereby said projection will clear said end bumping structure during travel of the car and after movement of said first named means to door releasing position.

5. A dump controller for cars traveling on tracks and having an end bumping structure and a bottom door hinged on the car to swing into open position by gravity and normally held in closed position by means located wholly above the lower surface of the end bumping structure comprising, a trip member movably mounted on the trackway between the tracks, a projection extending upwardly from said trip member to a point above the lower surface of the car end bumping structure and adapted to engage said means and move the same to door releasing position during travel of the car, and wedge shaped ribs formed on said trip member and adapted to contact said end bumping structure to force said trip member downwardly during travel of the car over the trip member whereby said projection will clear the end bumping structure.

6. A dump controller for cars traveling on tracks and having an end bumping structure and a bottom door hinged on the car to swing into open position by gravity and normally held in closed position by means located wholly above the lower surface of the end bumping structure comprising, a trip member movably mounted on the trackway between the tracks, a projection extending upwardly from said trip member to a point above the lower surface of the car end bumping structure and adapted to engage said means and move the same to door releasing position during forward travel of the car, and wedge shaped ribs formed on said trip member in position to engage said means and force said trip member downwardly during reverse travel of the car over the trip member whereby said projection cannot engage said means.

7. A dump controller structure as characterized in claim 9 wherein springs are provided for constantly urging said trip member upwardly toward the car.

8. A dump controller structure as characterized in claim 9 wherein a counterweight is connected to said trip member for urging the same upwardly toward the car and with a substantially constant pressure.

9. In a drop bottom car having side walls, an end wall and an end sill structure, said end sill structure including a top plate, a hinged door closing a portion of the space between the side walls and adapted to swing to open position by gravity, means adapted to releasably hold said door in closed position and comprising in its entirety, a pivot pin carried by said top plate, a hook mounted on said pivot pin in position to engage said door, and a resilient member secured to said end wall and extending through said top plate constantly urging said hook into engagement with the door.

10. In a drop bottom car having side walls, an end wall and an end sill structure, said end sill structure including a top plate, a hinged door closing a portion of the space between the side walls and adapted to swing to open position by gravity, means adapted to releasably hold said door in closed position and comprising in its entirety, a pivot pin extending transversely of the car and carried by the top plate, a hook mounted on said pivot pin for swinging movement longitudinally of the car and of such a length as to position its lower end above the lower surface of the end sill structure, and a resilient member secured to said end wall and extending through said top plate constantly urging said hook into position to engage said door.

11. In conveying mechanism, the combination with a trackway, a dumping conveyance movable along the trackway and including a lading body with a drop bottom door, and latch means for holding the door closed and movable to release the door for opening, of tripping mechanism including release means for actuating the latch to release the door, and separate means laterally spaced from said release means and substantially in the same upright transverse plane as said release means and actuated by bearing engagement with the under portion of the vehicle moving over the tripping mechanism for controlling the release means.

12. In conveying mechanism, the combination with a trackway, a dumping conveyance mounted on the trackway and including a lading body with a drop bottom door and latch means for holding the door in closed position and movable to release the door for opening, said latch means being located wholly above the lowest portion of the lading body in the same longitudinal vertical plane of the conveyance, or tripping mechanism mounted at the trackway and including an engaging member mounted for upward movement relative to the trackway in position for engaging the latch means during movement of the conveyance over the tripping mechanism to release said door, yieldable means normally tending to hold said engaging member in an elevated position, and a contact member substantially fixed relative to the engaging member and movable therewith in position to be raised and lowered by engagement with the under surface of the conveyance during movement thereover.

13. In conveying mechanism, the combination with a trackway, a dumping conveyance movable along the trackway and including a lading body with a drop bottom door, and latch means for holding the door closed and movable to release the door for opening, of tripping mechanism including release means in position to engage the latch means and release the door upon movement of the conveyance thereover, and separate means for raising and lowering said release means, said separate means being located laterally of the release means and substantially in the same upright transverse plane as said release means and in position to engage the under surface portions of the lading body during movement of the conveyance over the tripping mechanism.

14. In conveying mechanism, the combination with a trackway, a dumping conveyance movable along the trackway and including a lading body with a drop bottom door, and latch means for holding the door closed and movable to release the door for opening, of tripping mechanism mounted at the trackway and including latch release means in position to engage the latch means during movement of the conveyance over the tripping mechanism to release the door for opening, and means fixed relative to the latch release means and located at substantially the same elevation as said latch release means when said latch release means is in latch engaging position, and said means being in position for engagement by the under surface of the conveyance during movement thereof over the tripping mechanism for controlling the releasing position of the latch release means.

15. In conveying mechanism, the combination with a trackway, a dumping conveyance movable along the trackway and including a lading body with a drop bottom door, and latch means for holding the door closed and movable to release the door for opening, of tripping mechanism mounted at the trackway and including a latch release member mounted for upward movement to a position for engagement by the latch means during movement of the conveyance over the latch release mechanism, and a contact member fixed relative to the latch release member and located at substantially the same elevation as the latch release member in position to engage the under surface of the conveyance during movement of said conveyance over the tripping mechanism for causing lowering movement of said tripping mechanism relative to the conveyance.

16. In conveying mechanism, the combination with a trackway, a dumping conveyance movable along the trackway and including a lading body with a drop bottom door, and latch means for holding the door closed and movable to release the door for opening, of tripping mechanism mounted at the trackway and including an engaging member mounted for upward movement to a position for engagement by the latch means during movement of the conveyance over the tripping mechanism, a contact member fixed relative to said engaging member and extending to substantially the same elevation to be guided along the under surface of the conveyance to depress the engaging member beneath the conveyance, and yielding means normally tending to hold said engaging member in a raised position relative to the trackway.

17. A dump controller for cars traveling on tracks and equipped with bottom doors hinged to swing to open position by gravity and held in closed position by latch means located within the maximum cross-sectional contour of the car and comprising, a trip member pivotally mounted on the trackway and between the tracks, means urging said trip member upwardly for movement above the lowermost contour line of the car, a projection formed on said trip member and adapted to engage said latch means and move the same to door releasing position during travel of the car, and means having inclined surfaces extending both fore and aft from said projection and adapted to prevent engagement of said projection with car parts other than said latch means.

18. A dump controller for cars traveling on tracks and equipped with bottom doors hinged to swing to open position by gravity and held in closed position by latch means located within the maximum cross-sectional contour of the car and comprising, a trip member pivotally mounted on the trackway and between the tracks, means urging said trip member upwardly for movement above the lowermost contour line of the car, a projection formed on said trip member intermediate the side edges thereof and adapted to engage said latch means and move the same to door releasing position during travel of the car, and means having inclined surfaces located adjacent the sides of the trip member and extending both fore and aft from the transverse plane through said projection, said inclined surfaces being adapted to prevent engagement of said projection with car parts other than said latch means.

19. A dump controller for cars traveling on tracks and equipped with bottom doors hinged to swing to open position by gravity and held in closed position by latch means located within the maximum cross-sectional contour of the car and comprising, a trip member pivotally mounted on the trackway and between the tracks, means urging said trip member upwardly for movement above the lowermost contour line of the car, latch release means formed on said trip member and adapted to engage said latch means to move the same to door releasing position during travel of the car, and means having inclined surfaces extending both fore and aft from said latch release means and being adapted to engage parts of the car during travel of the car thereover and prevent engagement of said latch release means with car parts other than said latch means.

ROBERT C. KEPNER.

REFERENCES CITED

The following references are of record in the file of this patent:

UNITED STATES PATENTS

| Number | Name | Date |
|---|---|---|
| Re. 22,082 | Duncan | Apr. 28, 1942 |
| 1,084,607 | Chambers | Jan. 20, 1914 |
| 1,647,876 | McCrary | Nov. 1, 1927 |
| 1,727,689 | Almquist | Sept. 10, 1929 |
| 1,778,828 | Field | Oct. 21, 1930 |
| 1,851,695 | Dendler | Mar. 29, 1932 |
| 1,889,066 | Griffith | Nov. 29, 1932 |
| 2,001,471 | Sanford | May 14, 1935 |
| 2,044,019 | Sanford | June 16, 1936 |
| 2,092,801 | Dietrickson | Sept. 14, 1937 |
| 2,225,462 | Rose | Dec. 17, 1940 |
| 2,399,708 | Sanford | May 7, 1946 |